May 30, 1950 A. G. KANDOIAN 2,509,235

PULSED OSCILLATOR

Filed May 13, 1948 2 Sheets-Sheet 1

INVENTOR.
ARMIG G. KANDOIAN

BY [signature]

ATTORNEY

INVENTOR.
ARMIG G. KANDOIAN
BY
[signature]
ATTORNEY

Patented May 30, 1950

2,509,235

UNITED STATES PATENT OFFICE 2,509,235

PULSED OSCILLATOR

Armig G. Kandoian, Glen Rock, N. J., assignor to International Standard Electric Corporation, New York, N. Y., a corporation of Delaware Application May 13, 1948, Serial No. 26,798

10 Claims. (Cl. 250—36)

This invention relates to radiating systems and more particularly it relates to systems for radiating pulses of high frequency energy.

In oscillation generators of the type which are keyed by pulses into oscillation, the inherent noise effects generally may control the time at which the oscillation becomes effective. Under these circumstances the timing of the pulses may not be precise but will vary back and forth in a random manner dependent upon the noise disturbance levels. To avoid this difficulty it has been proposed to provide an auxiliary oscillator, for example of the spark gap type feeding into the oscillator more precisely to control the timing of pulse oscillation initiation.

It is an object of the invention to provide a source of such auxiliary oscillations generated directly by operation of the main oscillator and not dependent upon an external generator.

A feature of the invention relates to a self-excited high frequency oscillator having a generation conditioning arrangement employing a high Q resonant circuit coupled reactively to the self-excitation portion of the oscillator, to render the initiation of oscillation pulses independent of the random noise voltage conditions within the oscillator.

Another feature relates to a self-excited oscillator of the grid-controlled electron tube type having coupled to its self-excitation circuits a high Q resonant cavity for the purpose of rendering the timed initiation of the oscillation pulses independent of the random noise voltage conditions within the oscillator.

A further feature relates to a modulated or pulsed oscillator which is coupled reactively to an "echo box" for the purpose of rendering the timed initiation of the oscillator pulses independent of the random noise voltage conditions within the oscillator.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
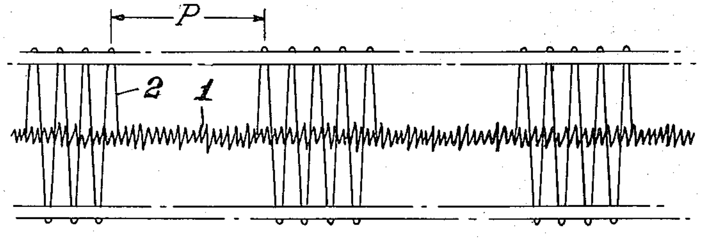
Figs. 1 and 2 are respective graph diagrams explanatory of the invention.

In one well-known system for producing pulsed groups of ultra-high frequency waves, a self-excited oscillator of the grid-controlled electron tube type, has its anode voltage keyed "off" and "on" or modulated under control of a pulse modulator. It has been found that when these pulsed anode voltages are applied for an extremely short interval, for example a few microseconds at a time, the pulsed output from the oscillator is not always the same for successive equal modulating pulses. One of the reasons for this is that the preconditioning of the oscillator as a generator, is a function of the random noise voltage conditions existing inherently within the oscillator system. Thus, as shown in Fig. 1, the graph 1 represents the random noise voltage conditions, while the graph 2 represents the output of ultra-high frequency oscillations occurring in time-spaced pulses P. It can be shown that in a self-excited oscillator, the generated oscillation waves build up exponentially from a very small value to their respective peak values. It is clear therefore, that the amplitude of the inherent random noise voltage in the oscillator will have an appreciable effect on the rate of the said exponential build-up. That is to say, if the random fluctuation should be practically nil, the build-up is initiated at substantially zero value on the exponential curve. If the fluctuation voltage is of some more appreciable amplitude, the build-up is initiated at a point further along the exponential curve and the resulting pulse envelope for the same energizing potential will be larger, and the wave front thereof will occur in time relation in advance of the wave front of a pulse envelope initiated further down the exponential curve.

Figure 2:
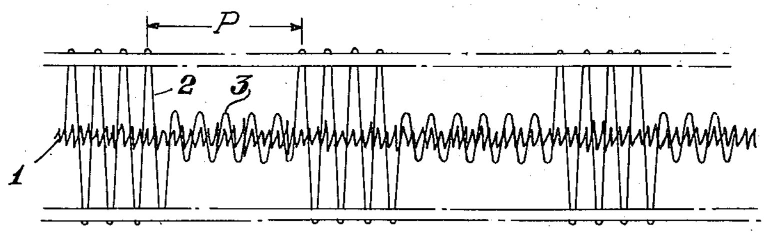

In accordance with this invention, the preconditioning of the oscillator is rendered independent of its inherent random noise voltage conditions, by using part of the wave energy from one generated pulse of oscillations from the oscillator to maintain a preconditioning voltage within the oscillator of regular amplitude and frequency so as to bridge the time interval between the successive pulses P. This preconditioning voltage can be made of any desired level, so that when the anode of the oscillator receives its modulating pulsing potential, it always responds at an accurately predictable instant. I have found that this result is best achieved by using a wave energy storing device such as a high Q resonant cavity, for example the well-known "echo box" that is used in radar system setups. Such an "echo box," as is well-known, comprises a high Q resonant cavity provided with suitable coupling loops. One of these loops is excited by ultra-high frequency source, and while the energy is being thus picked up, the "echo box" stores it until the end of the excitation pulse. At the completion of the pulse, the "echo box" reradiates the previously stored energy. The time elapsing between the termination of the excitation pulse and the dropping of the reradiated echo to a certain minimum, is known as the "ringing time." This storage characteristic of an "echo box" is taken advantage of in the present invention, by coupling the reradiated echo voltage into the ultra-high frequency oscillator so as to bridge the time gaps between successive "off" and "on" keyings of the anode voltage of the oscillator-generator. This bridging condition is shown in Fig. 2, wherein the curves 1 and 2 represent respectively the random noise voltage and the generated ultra-high frequency voltage as in Fig. 1, and the curve 3 represents the interpolated echo voltage above-mentioned.

Referring to Fig. 1, there is shown an ultra-high frequency oscillator, comprising, for example, two grid-controlled electron tubes 4, 5, having their grid and plate circuits intercoupled to generate sustained oscillations by well-known feedback action. Preferably, although not necessarily, the tubes are connected for push-pull operation. Thus, the cathode 6 is connected through a tunable resonant network 7, to the cathode 8, of tube 5. Likewise, the grid 9 of tube 4 is connected through a tunable resonant network 10, to the grid 11. In a similar manner, the plate 12 of tube 4 is connected to the plate 13 of tube 5, by a tuned resonant network 14. Merely for illustration, the networks 7, 10 and 14, are shown in the drawing as of the wave transmission line type, and tuned to the frequency of the generated oscillations.

A modulator 15 of any well-known kind, for producing high frequency voltage D. C. pulses of accurately timed and well defined wave front, is connected by a suitable line 16 to the electrical midpoint of the tuned line 14 and thence to the anodes 12, 13. Mounted adjacent the line 7, 10 and 14, is a tunable "echo box" 17, such as is well-known in radar systems, and comprising a high Q resonant cavity 18 with a tuning plunger 19, and a small dipole 20, having a coupling loop 21 within the cavity. Consequently, when the oscillator is keyed "on" by the modulator 15, the cavity 18 is excited by the ultra-high frequency energy pick-up by dipole 20. Because of the high Q or low dissipation factor of the box 17, it continues to oscillate or ring for a considerable period after the excitation pulse picked up by dipole 20 has ceased. However, by well-known theory, the wave energy stored in box 17 is then reradiated by dipole 20 into the ultra-high frequency oscillator, for example by acting on one or more of the lines 7, 10 and 14, to set up preconditioning voltages within the oscillator system as represented by the curve 3 of Fig. 2.

As a specific example, let it be assumed that the duration of each pulse P (Figs. 1 and 2) is two microseconds, and that the interpulse interval is ten microseconds, and that the cavity 18 has a Q of 10,000. Then the "ringing" or bridging period of the "echo box" can be made to be as much as twenty microseconds. As a result, the ultra-high frequency oscillator need not rely for starting or build up of its waves, on the instantaneous value of its inherent random noise voltage when it is keyed "on" by modulator 15, because the "echo box" ringing voltage will provide the oscillator with a larger preconditioning voltage which can be of a single frequency and regular amplitude. If the ultra-high frequency oscillator is being used as a pulse-time modulated transmitter, there is obtained an improved ratio of signal-to-noise. Furthermore, since the box 17 is a source of highly stable frequency, it provides a constantly acting stabilizing influence on the less stable, but more powerful pulsed self-excited oscillator. Improved efficiency of the transmitter is thus obtained because the initiation of each transmitted pulse is effected more rapidly, and less of the pulse energy is expended in useless D. C. dissipation.

Figure 3:
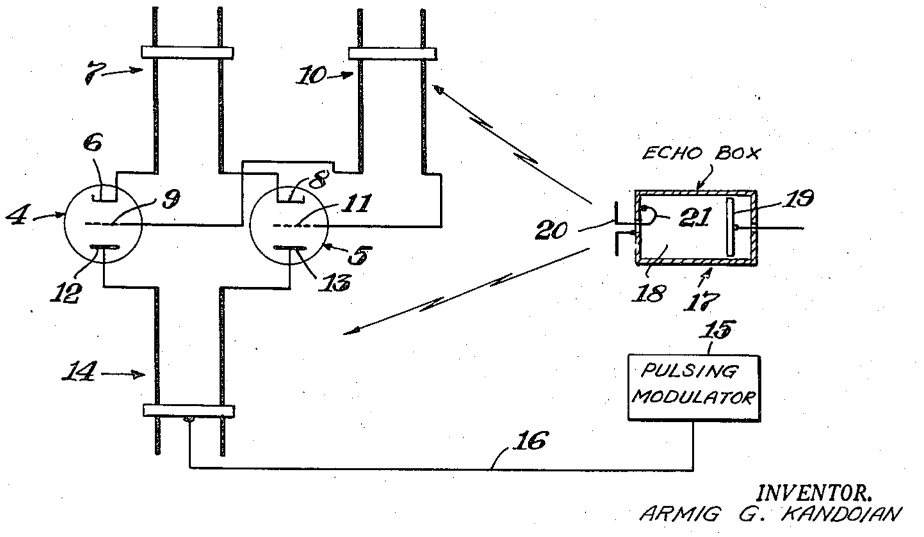
Fig. 3 is a schematic wiring diagram of an oscillator system embodying the invention.
Figure 4:
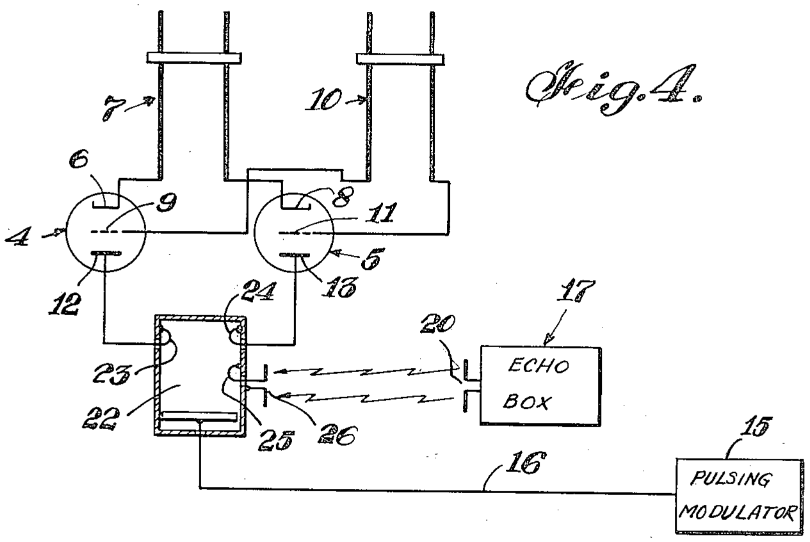
Figs. 4 and 5 are respective modifications of the system of Fig. 3.

Fig. 4 shows a modification of Fig. 3. The parts of Figs. 3 and 4 which are functionally identical, are designated alike. However, in this embodiment, the plates 12 and 13 are connected to the pulsing modulator 15, by means of a tunable resonant cavity 22 by means of small inductive loops 23, 24, D. C. connected to the cavity. Also coupled to the cavity space by a small inductive loop 25 is a small dipole 26 which is directly or radiatively coupled to the "echo box" 17. The system of Fig. 4, operates substantially the same as that of Fig. 3 in that the reradiated ringing energy from the box 17 is picked up by the dipole 26 and renders the pulsing potential from the modulator 15 effective uniformly on the oscillator.

Figure 5:
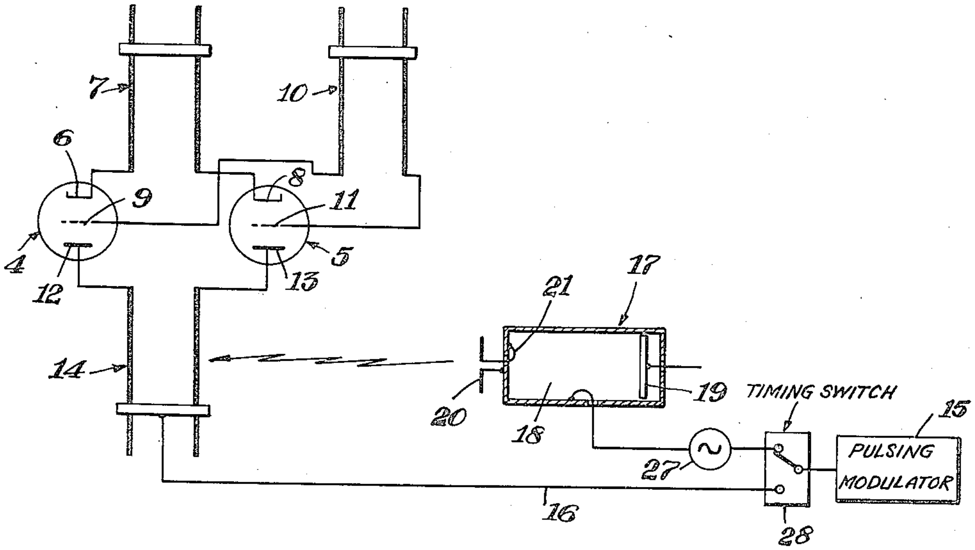

Fig. 5 shows a modification of Figs. 3 and 4. It may be found that under certain conditions, it is not practicable to provide an "echo box" 17 having a sufficiently high Q to provide the necessary bridging ringing voltage between successive pulses from the oscillator. An arrangement for avoiding this difficulty is shown in Fig. 5, wherein the "echo box" 17 is excited by a small local ultra-high frequency oscillator 27 of approximately the same frequency as the main oscillator. The oscillator 27 is connected to the pulsing modulator 15, so as to be pulsed slightly in advance of the pulsing of the main oscillator, for example a few microseconds in advance thereof. The ultra-high frequency energy from oscillator 27 excites the cavity 18 so that after the termination of each pulse from oscillator 27, the box 17 rings and reradiates the ultra-high frequency energy from its dipole 20 to the dipole 26 associated with the resonant cavity 22. The block 28 in Fig. 5 represents any well-known arrangement for timing the application of the modulating pulses to oscillator 27 slightly in advance of the application of the same modulating pulse to the main oscillator. It may take, for example, the form of an electronic commutator or electronic relay for alternatively applying the modulating pulses from modulator 15 to the auxiliary oscillator 27 and to the main oscillator in the proper timed relation.

While I have described above the principles of my invention in connection with specific apparatus, it is to be clearly understood that this description is made only by way of example and not as a limitation to the scope of my invention.

What is claimed is:

1. The method of controlling the impulsing of an electron tube oscillator, which comprises applying potential pulses to the anode of the oscillator to produce spaced groups of output oscillations corresponding to the said pulses, applying said output oscillations to excite and store up energy in a resonator which is capable of producing echo wave energy, and coupling said echo wave energy into said oscillator to render the generation of its oscillations substantially independent of random noise voltages inherent in the oscillator system.

2. The method of controlling the impulsing of an electron tube oscillator, which comprises applying instantaneous potential pulses to the anode of the oscillator to produce spaced groups of output oscillations corresponding in duration to the period between successive pulses, applying said output oscillations to excite and store up energy in a resonator which is capable of producing echo wave energy, and coupling said echo wave energy to said oscillator to precondition the oscillator between successive groups of output oscillations.

3. The method of rendering an anode-pulsed self-excited high frequency electron tube oscillator substantially independent of its inherent random noise voltage conditions, which comprises setting up a high frequency echo wave under control of the output of the oscillator, and coupling said echo wave into the oscillator to bridge the intervals between successive pulsed output waves of the oscillator.

4. The method according to claim 3 in which the echo wave is of the same frequency as the generated oscillations.

5. An oscillator system comprising an electron tube oscillator, means to apply potential pulses to the anode of said oscillator to produce spaced groups of output oscillations corresponding to said pulses, a wave energy resonator device excited by the waves from the output of said oscillator, a second resonator device producing corresponding echo wave energy, and means for coupling said echo wave energy into said oscillator to render the generation of its oscillations substantially independent of random noise voltages inherent in the oscillator system.

6. A system according to claim 5 in which said second resonator comprises a high Q wave resonant cavity.

7. A system according to claim 5 in which said second resonator comprises a tunable resonant cavity which is radiatively coupled to the excitation circuits of said oscillator.

8. A system according to claim 5 in which said second resonator comprises a cavity resonator in the form of an echo box having a radiating element coupled to the cavity and to the excitation circuits of said oscillator.

9. A system according to claim 5 in which said second resonator comprises an echo box in the form of a cavity resonator having a radiation element coupled to the cavity, said radiation element being radiatively coupled to another radiation pick-up element which in turn is coupled to a cavity resonator connected in the excitation circuits of said oscillator.

10. An oscillator system comprising a self-excited oscillator, a pulsing modulator for applying D. C. pulses to the anode of said oscillator to key it "on" and "off," an echo box coupled to the oscillator output to feed into the oscillator between successive pulses echo waves of fixed frequency and amplitude derived from the said oscillator output.

ARMIG G. KANDOIAN.

REFERENCES CITED

The following references are of record in the file of this patent:

UNITED STATES PATENTS

| Number | Name | Date |
|---|---|---|
| 2,392,380 | Varian | Jan. 8, 1946 |